(12) United States Patent
Akahane

(10) Patent No.: US 8,488,212 B2
(45) Date of Patent: Jul. 16, 2013

(54) IMAGE READING APPARATUS, IMAGE READING PROGRAM, AND IMAGE READING METHOD

(75) Inventor: Takuya Akahane, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 759 days.

(21) Appl. No.: 12/632,671

(22) Filed: Dec. 7, 2009

(65) Prior Publication Data

US 2010/0142011 A1 Jun. 10, 2010

(30) Foreign Application Priority Data

Dec. 10, 2008 (JP) ................................. 2008-314085

(51) Int. Cl.
*H04N 1/04* (2006.01)
*H04N 1/00* (2006.01)
*H04N 1/40* (2006.01)

(52) U.S. Cl.
USPC ........... 358/474; 358/496; 358/497; 358/498; 358/409; 358/412; 358/488; 358/486; 358/404; 358/444; 358/468; 358/442

(58) Field of Classification Search
USPC ................. 358/496, 498, 497, 412, 409, 404, 358/444, 486, 468, 488, 474, 442; 382/318, 382/319
See application file for complete search history.

(56) References Cited

U.S. PATENT DOCUMENTS

| | | | |
|---|---|---|---|
| 5,220,437 A | 6/1993 | Saegusa et al. | |
| 6,851,609 B2 | 2/2005 | Ando et al. | |
| 7,301,680 B1 * | 11/2007 | Jones | 358/496 |
| 7,471,425 B2 * | 12/2008 | Huang et al. | 358/474 |
| 7,889,400 B2 * | 2/2011 | Akiyama | 358/496 |
| 8,040,577 B2 * | 10/2011 | Akiyama | 358/486 |
| 8,253,988 B2 * | 8/2012 | Inukai | 358/474 |
| 2004/0125416 A1 | 7/2004 | Gawlik et al. | |
| 2008/0117481 A1 * | 5/2008 | Akiyama | 358/488 |
| 2008/0180699 A1 | 7/2008 | Selvaraj | |
| 2009/0066988 A1 * | 3/2009 | Imaizumi | 358/1.13 |
| 2009/0316233 A1 * | 12/2009 | Inukai | 358/498 |
| 2010/0141999 A1 * | 6/2010 | Akahane | 358/1.16 |
| 2011/0242611 A1 * | 10/2011 | Nozaki | 358/437 |
| 2011/0242620 A1 * | 10/2011 | Yamamoto | 358/488 |

FOREIGN PATENT DOCUMENTS

| | | |
|---|---|---|
| JP | 02-306764 A | 12/1990 |
| JP | 03-219764 A | 9/1991 |
| JP | 10-051599 A | 2/1998 |
| JP | 2001-111794 A | 4/2001 |

(Continued)

*Primary Examiner* — Cheukfan Lee
(74) *Attorney, Agent, or Firm* — Kilpatrick Townsend & Stockton LLP

(57) ABSTRACT

An image reading apparatus including, a sheet feeding device, a sheet feeding section that controls transport of an original document performed by the sheet feeding device, a reading section that outputs image data by reading the original document, a carriage that is equipped with the reading section, a carriage control section that controls movement of the carriage, a buffer that temporarily stores the image data, and a monitoring section that monitors a volume of the image data stored in the buffer. When the monitoring section determines that the volume of the image data is more than a predetermined threshold value, the sheet feeding section decelerates and stops the transport of the original document, and the carriage control section accelerates the carriage in a direction opposite to the transport of the original document during a deceleration period of the transport of the original document.

6 Claims, 9 Drawing Sheets

FOREIGN PATENT DOCUMENTS

| | | |
|---|---|---|
| JP | 2002-016769 A | 1/2002 |
| JP | 2002-135531 A | 5/2002 |
| JP | 2002-204339 A | 7/2002 |
| JP | 2002-281256 A | 9/2002 |
| JP | 2006-020084 A | 1/2006 |
| JP | 2008-129063 A | 6/2008 |

* cited by examiner

FIG. 3

| MODE | ACCELERATION CONTROL DATA | DECELERATION CONTROL DATA | CARRIAGE CONTROL DATA |
|---|---|---|---|
| A | *** | *** | *** |
| B | *** | *** | *** |
| C | *** | *** | *** |
| D | – | – | – |

A, B, C: HIGH SPEED
D: LOW SPEED 210, 220, 230, 240, 200

ORIGINAL IMAGE

IMAGE READING PROCESS

OUTPUT IMAGE

ORIGINAL IMAGE

IMAGE READING PROCESS

OUTPUT IMAGE

IMAGE READING APPARATUS, IMAGE READING PROGRAM, AND IMAGE READING METHOD

This application claims priority to Japanese Patent Application No. 2008-314085, filed Dec. 10, 2008 the entirety of which is incorporated by reference herein.

BACKGROUND

1. Technical Field

The present invention relates to an image reading technique using an ADF (Auto Document Feeder) function.

2. Related Art

Image scanners (image reading apparatuses) are known which have the ADF (Auto Document Feeder) function. In such scanners, the entire image of the original document is read by a stationary image sensor while the original document is moved at a constant speed (for example, JP-A-2006-20084).

The image scanners temporarily store the read image data in a buffer, and sequentially transmit the data to a host such as a personal computer (PC). The transmission speed is determined in accordance with the processing capability of the host computer. Hence, the reading speed of the image scanner is adjusted to a low speed which does not result in the buffer being filled up.

However, there is a demand for an increase in reading speed, but if the reading speed is high, the buffer tends to fill up. At this point, when the buffer is nearly full, a method can be considered in which the sheet feeding of the original document is temporarily stopped.

However, when a sheet feeding roller of a sheet feeding device is driven at a speed more than a predetermined speed, sudden stopping may be not allowed in a mechanical structure. Thus, a deceleration step is required.

In existing image scanners, the deceleration step is not considered. If an image is read by the image scanner even during the period of the deceleration step similarly to the period of the constant speed before the start of the deceleration step, this causes distortion in the read image.

SUMMARY

An advantage of some aspects of the invention is that it provides a technique that enables feasible high speed reading with a simple configuration in image reading apparatuses including a sheet feeding device.

According to a first aspect of the invention, an image reading apparatus includes: a sheet feeding device; a sheet feeding section that controls transport of an original document performed by the sheet feeding device; a reading section that outputs image data by reading the original document; a carriage that is equipped with the reading section; a carriage control section that controls movement of the carriage; a buffer that temporarily stores the image data; and a monitoring section that monitors a volume of the image data stored in the buffer. When the monitoring section determines that the volume of the image data is more than a predetermined first threshold value, the sheet feeding section decelerates and stops the transport of the original document, the carriage control section accelerates the carriage in a direction opposite to the transport of the original document during a deceleration period of the transport of the original document, and the reading section successively reads the original document before the start of the deceleration period of the transport of the original document and during the deceleration period.

In the image reading apparatus according to the aspect of the invention, it is preferred that a relative speed of the original document based on a position of the carriage be constant during the deceleration period of the transport of the original document.

In the image reading apparatus according to the aspect of the invention, it is preferred that, when the monitoring section determines that the volume of the image data is less than a predetermined second threshold value, the sheet feeding section starts acceleration of the transport of the original document, the carriage control section should accelerate the carriage in a direction opposite to the transport of the original document before the start of an acceleration period of the transport of the original document and decelerates the carriage in a direction opposite to the transport of the original document during the acceleration period of the transport of the original document, and the reading section restarts reading of the original document at the time of the start of the acceleration of the transport of the original document.

In the image reading apparatus according to the aspect of the invention, it is preferred that the first threshold value be changeable in accordance with a length of the deceleration period.

According to a second aspect of the invention, provided is an image reading method for an image reading apparatus which has a sheet feeding device for transporting an original document, a carriage, and a buffer for temporarily storing image data of the read original document. The image reading method includes: determining whether or not a volume of the image data stored in the buffer is more than a predetermined first threshold value; and reading the original document successively before the start of a deceleration period of the transport of the original document and during the deceleration period by decelerating and stopping the transport of the original document and accelerating the carriage in a direction opposite to the transport of the original document during the deceleration period of the transport of the original document when the volume of the image data is more than the first threshold value.

According to a third aspect of the invention, provided is a program for causing an image reading apparatus, which has a sheet feeding device for transporting an original document, a carriage, and a buffer for temporarily storing image data of the read original document, to perform an image reading process. The program causes the image reading apparatus to execute: determining whether or not a volume of the image data stored in the buffer is more than a predetermined first threshold value; and reading the original document successively before the start of a deceleration period of the transport of the original document and during the deceleration period by decelerating and stopping the transport of the original document and accelerating the carriage in a direction opposite to the transport of the original document during the deceleration period of the transport of the original document when the volume of the image data is more than the first threshold value.

BRIEF DESCRIPTION OF THE DRAWINGS

The invention will be described with reference to the accompanying drawings, wherein like numbers reference like elements.

FIG. 3 is a diagram illustrating an exemplary configuration of a motor control table.

DESCRIPTION OF EXEMPLARY EMBODIMENTS

Hereinafter, an embodiment of the invention will be described.

Figure 1:
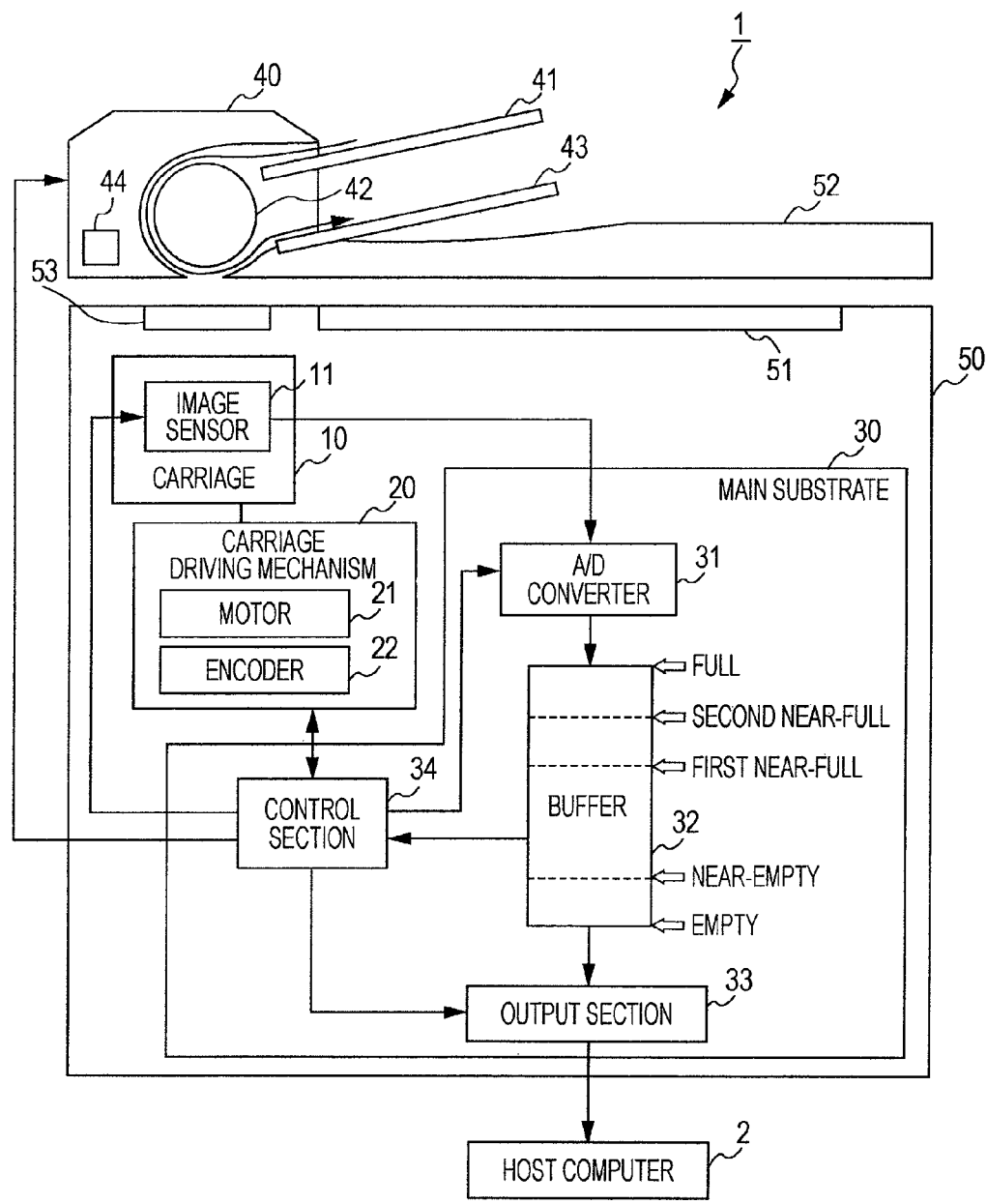
FIG. 1 is a diagram illustrating a schematic configuration of an image scanner of an image reading apparatus according to an embodiment of the invention.

FIG. 1 shows a schematic configuration diagram of an image scanner 1 which is an example of an image reading apparatus according to the embodiment of the invention.

The image scanner 1 is a so-called flat bed type image scanner having a platen formed on an upper surface of a casing. The image scanner 1 reads an image by irradiating light onto the original document, which is fixed on the platen with a transparent plate, from below and scanning it with the image sensor 11.

The image scanner 1 includes an upward platen 50 on which the original document which is a target reading medium is placed, an original document placing surface (a board surface) 51 of the platen 50, and a cover 52 for covering an image reading window 53 from above. The cover 52 is combined with the platen 50 through a hinge tool, and is openable.

A sheet feeding device (ADF) 40 is provided integrally with the cover 52 on the left side of the board surface 51 in the drawing (the upstream side in a flow direction of the original document), that is, on the upper side of the image reading window 53. The sheet feeding device 40 has a sheet feeding tray 41, a transport roller (a sheet feeding roller) 42, a sheet discharging tray 43, a driving motor (a stepping motor) 44. The rotation of the transport roller 42 is controlled by the driving motor 44. The sheet feeding device 40 sends the original document placed on the sheet feeding tray 41 to the upper surface of the image reading window 53, and makes it pass the upper surface.

The image scanner 1 includes, below the platen 50, a carriage (referred to as "CR") 10 which is equipped with the CCD color image sensor 11, a carriage driving mechanism 20 which controls reciprocation of the carriage 10, and a main substrate 30 which controls the entire system of the image scanner 1.

The carriage 10 transports the image sensor 11 in a sub-scanning direction. The carriage 10 is slidably mounted on a guiding shaft and the like parallel to the board surface 51 and the image reading window 53 of the platen 50. The carriage 10 is pulled by a belt which is rotated by the motor 21 of the carriage driving mechanism 20, and is reciprocated. When the reading is performed while the original document is transported by the sheet feeding device 40, the carriage 10 is fixed at a predetermined position below the image reading window 53.

The carriage driving mechanism 20 includes a motor 21 for rotating the belt mounted on the carriage 10 and an encoder 22 for outputting pulses in accordance with the amount of rotation of the motor 21.

The main substrate 30 has an A/D converter 31, a buffer 32, an output section 33, and a control section 34.

The A/D converter 31 converts an analog signal from the image sensor 11 to a digital signal.

The buffer 32 temporarily stores data output from the A/D converter 31, and sends the data to the output section 33 in order from the data stored first, in the first-in first-out FIFO mode. When the volume of the stored data is more than a predetermined data volume (a first near-full value), then the buffer 32 starts receiving the data which is read in the process of the deceleration step of the driving motor 44 of the sheet feeding device 40. When the volume of the stored data is more than a predetermined data volume (a second near-full value), the buffer 32 stops receiving the data. Then, only by transmitting the data to the output section 33, the buffer 32 does not receive the next data until the volume of the stored data is less than a predetermined data volume (a near-empty value).

The first near-full value, the second near-full value, and the near-empty value, which are values relating to the data volume of the buffer 32, are described herein.

In the embodiment, even during the deceleration step of the driving motor 44, the read data is transmitted to the buffer 32. The first near-full value is defined as a maximum limit of the data volume capable of receiving the data, which is read in the process of the deceleration step, without causing the buffer 32 to be full. That is, the first near-full value is a value at which the deceleration step is terminated when the data volume is more than the second near-full value even though the reading of the data from the buffer 32 due to the output section 33 is stopped. The first near-full value is adjusted to the volume of the data which is read in the process of the deceleration step for each high speed mode to be described later.

Even after the reading of the image is terminated and the instruction to stop the reading operation is issued from the control section 34 to the image sensor 11, the data which is already read is transmitted to the buffer 32. The second near-full value is defined as a maximum limit of the data volume capable of receiving the data, which is being transmitted, without causing the buffer 32 to be full.

On the other hand, even after the instruction to restart the reading is issued, it takes time for the read data to reach the buffer 32. Accordingly, when the buffer is set to be completely empty, the data sent to the host computer 2 is discontinued, thereby lowering throughput. The near-empty value is a minimum limit of the data volume which is set not to discontinue the data.

The output section 33 sends the data of the buffer 32 to the host computer 2 (a scanner control device) such as a personal computer at a transmission speed depending on the processing capability of the host.

The control section 34 controls the sheet feeding device 40, the carriage driving mechanism 20, and the image sensor 11. Specifically, the control section 34 controls the driving motor 44 of the transport roller 42 of the sheet feeding device 40, and transports the original document of the sheet feeding tray 41 to the right side of the drawing (the downstream side in the flow direction of the original document), thereby making the original document pass the image reading window 53. The control section 34 controls the rotation of the motor 21 of the carriage driving mechanism 20, thereby controlling the movement of the carriage 10. Further, the control section 34 calculates the movement speed and the position of the carriage 10 from the output pulses of the encoder 22. Further, the control section 34 controls the image reading operation of the image sensor 11 to start and stop.

The control section 34 monitors the data volume of the buffer 32. Although described later in detail, when the predetermined first near-full value is exceeded in the high speed mode, the control section 34 controls the driving motor 44 to start the deceleration step and controls the motor 21 to start accelerating the carriage 10 toward the left side in the drawing (the downstream side in the flow direction of the original document). Furthermore, the reading operation of the image sensor 11 is continued. When the deceleration step is terminated (the driving motor 44 is stopped), the control section 34 stops the reading operation of the image sensor 11 and stops the movement of the carriage 10 (stops the movement by starting the deceleration).

In contrast, in the low speed mode, the control section 34 monitors the data volume of the buffer 32, and stops the reading operation of the image sensor 11 if the predetermined second near-full value is exceeded.

After the stopping of the reading operation of the image sensor 11, if the data volume is less than near-empty value, the control section 34 restarts the sheet feeding operation of the sheet feeding device 40 and restarts the reading operation of the image sensor 11.

The control section 34 may be formed as a computer having a CPU which is a control device, a ROM in which a program is recorded, and a RAM which is a main memory for temporarily storing the data and the like. Furthermore, the control section 34 may be formed as an ASIC (Application Specific Integrated Circuit) designed to perform processings only.

As described above, the schematic configuration of the image scanner 1 has been described. However, the description shows a principal configuration for explaining characteristics of the embodiment of the invention but the other configurations of general image scanners may be also allowed.

Next, peculiar operations of the image scanner 1 configured as described above will be described.

Figure 2:
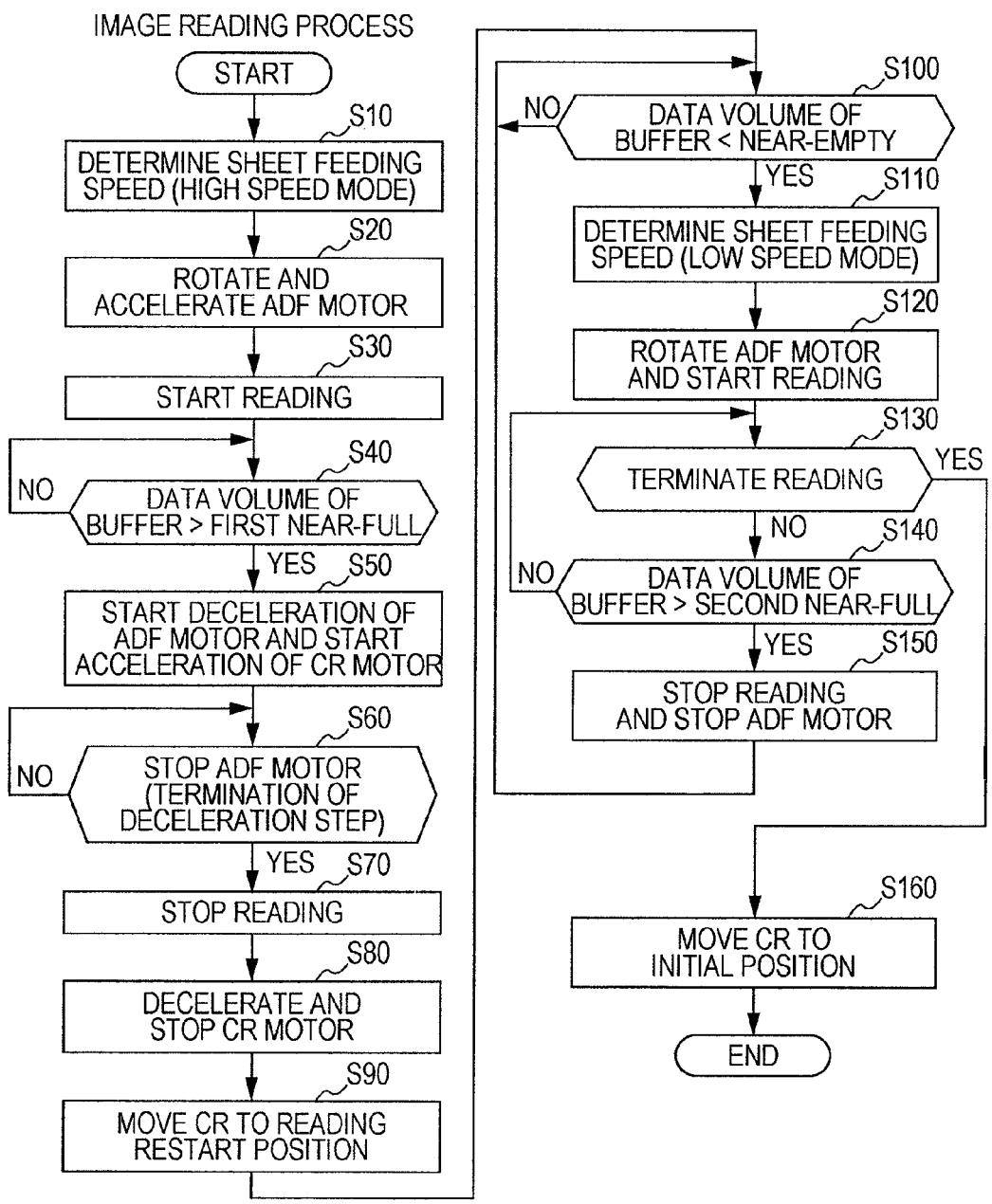
FIG. 2 is a flowchart of an image reading process of the image scanner.

FIG. 2 is a flowchart of an image reading process of the image scanner 1. The flow shows the case of the reading of the image data for one page. The control section 34 starts the flow when accepting a request for the reading of the original document from a user.

First, the control section 34 determines the sheet feeding speed (the high speed mode) (step S10). Hence, the control section 34 has a table. Such a table (a motor control table 200) is described herein. FIG. 3 shows an exemplary configuration of a motor control table 200.

The motor control table 200 stores a plurality of entries relating to a mode 210, acceleration control data 220, deceleration control data 230, and carriage control data 240. Each of the entries is information according to the mode of the sheet feeding speed.

In the drawing, examples of modes including high speed modes (A to C) and a low speed mode (D) are shown. In the high speed modes (A to C), in order to rotate the driving motor 44 of the transport roller 42 at the high speed, the control of the acceleration step for reaching the speed and the control of the deceleration step for stopping the roller are required. In contrast, in the low speed mode (D), since the acceleration and the deceleration are not needed for low speed rotation, the controls of the acceleration step and deceleration step are not required. The high speed modes are provided in accordance with resolution of the reading. It is apparent that a plurality of high speed modes may be provided for the same resolution of the reading.

The mode 210 is information for specifying the mode of the sheet feeding speed.

The acceleration control data 220 is control information for accelerating the rotation of the driving motor 44 of the transport roller 42 up to a regular speed. For example, the data includes the number of steps required for the acceleration and timing information for applying current for increasing the speed for each step. As described above, in the entry of the low speed mode (D), the acceleration control data 220 is not set (represented by "-" in the drawing).

The deceleration control data 230 is control information for stopping the rotation of the driving motor 44 of the transport roller 42 by decelerating the rotation from the regular speed. For example, the data includes the number of steps required for the deceleration and timing information for applying current for decreasing the speed for each step. As described above, in the entry of the low speed mode (D), the deceleration control data 230 is not set (represented by "-" in the drawing).

The carriage control data 240 is control information for controlling the rotation of the motor 21 of the carriage driving mechanism 20 so as to accelerate the carriage 10 at a predetermined distance in a direction opposite to the sheet feeding direction while transporting the original document in the sheet feeding direction (the sub-scanning direction) during the deceleration step controlled by the deceleration control data 230. When the motor 21 is a stepping motor, the data includes the number of steps required for the acceleration and timing information for applying current for increasing the speed for each step. Further, the carriage control data 240 includes information for controlling the deceleration after the acceleration. When the motor 21 is a DC motor, the data includes information representing a magnitude of a voltage and timing information for applying a voltage.

Here, the distance and the speed of the carriage 10 to move in the opposite sheet feeding direction are described. In the embodiment, when the control section 34 performs the sheet feeding operation in the high speed mode, the control section 34 starts the deceleration step of the sheet feeding operation of the sheet feeding device 40 if the data volume of the buffer 32 is more than the predetermined first near-full value. In addition, the reading operation of the image sensor 11 is continued even in the deceleration step.

Figure 4:
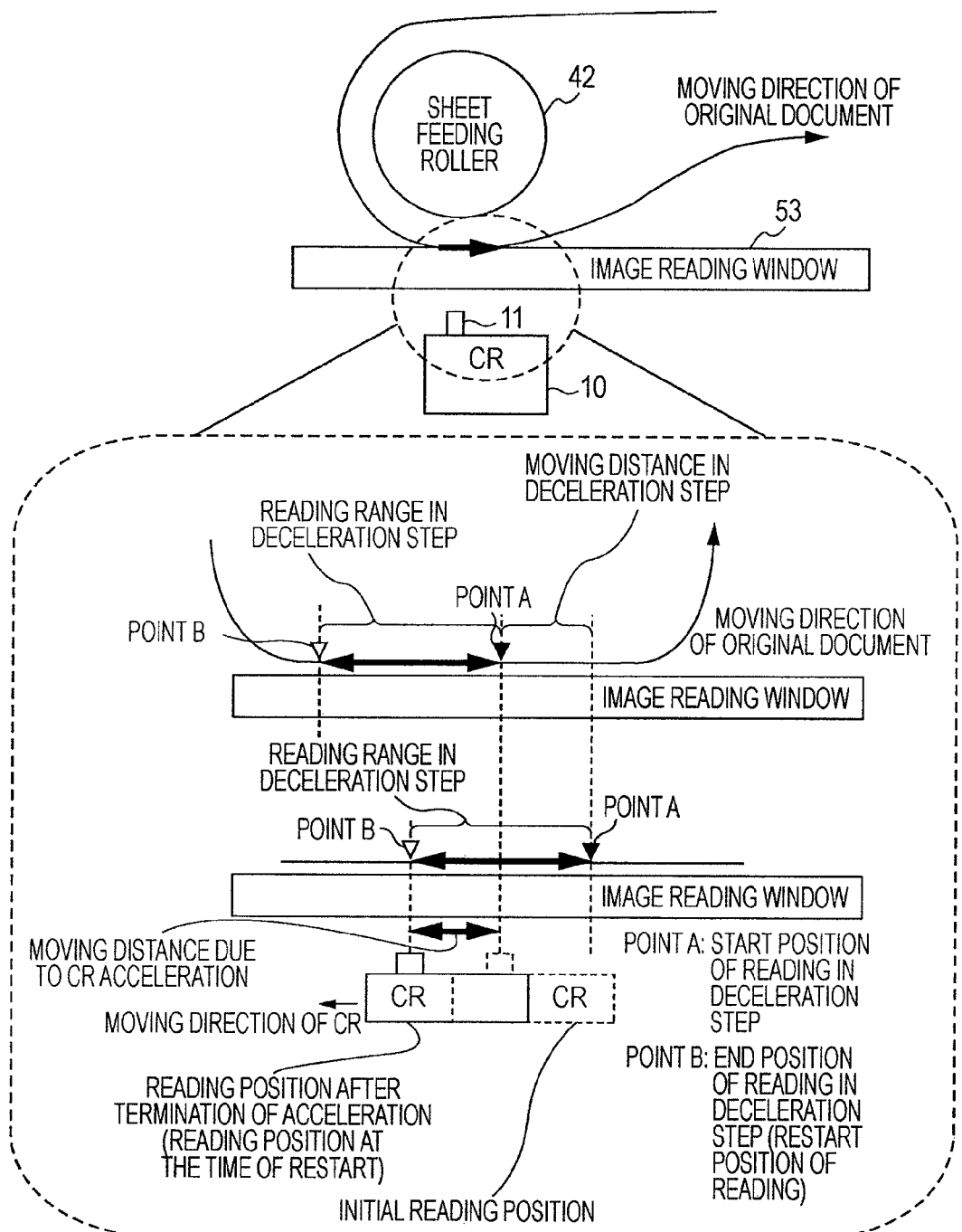
FIG. 4 is a diagram illustrating a relationship between a position of a carriage and a reading range of an original document in a deceleration step.

For example, as shown in FIG. 4, the point A (the reading start position in the deceleration step) of the original document at the end time of the regular speed step (the constant speed step) of the high speed mode is gradually decelerated and moved in the sub-scanning direction by the movement of the original document in the process of the deceleration step. Hence, if the reading operation of the image sensor 11 is performed with the position of the carriage 10 fixed in the same manner as that in the constant speed step, the number of reading operations performed on the image increases, and thus distortion occurs in the read image.

Accordingly, the control section 34 starts the deceleration step of the sheet feeding operation and simultaneously starts movement of the carriage 10 away from the initial reading position in the opposite sheet feeding direction. The control section 34 accelerates the motor 21 while decelerating the driving motor 44 so as to make the sum of the moving speed of the carriage 10 and the moving speed of the original document equal to the predetermined speed of the constant speed step, in the process of the deceleration step of the sheet feeding operation. That is, the control section 34 controls the relative speed of the original document based on the position of the carriage 10 to be constant. Then, the carriage 10 reaches the point B (the reading end position in the deceleration step, the reading position after the termination of the acceleration) of the original document at which the deceleration step is terminated. In this case, the reading operation of the image sensor 11 is stopped, and the carriage 10 is stopped by starting the deceleration thereof.

As described above, the distance of the carriage 10 moved by the acceleration thereof becomes equal to the distance of the original document moved in the deceleration step. The speed of the carriage 10 is accelerated in accordance with the interval between the moving distances and the deceleration of the movement of the original document. Hence, the reading range of the original document in the deceleration step becomes longer than the moving distance of the acceleration of the carriage 10.

On the basis of the change in the speed and the moving distance of the carriage 10 specified in such a manner, the carriage control data 240 is previously set in the entries of the high speed modes (A to C) in accordance with each speed. In contrast, in the entry of the low speed mode (D), the carriage control data 240 is not set (represented by "-" in the drawing).

It is apparent that the configuration of the motor control table 200 is not limited to the above description. For example, the number of the high speed modes and the number of the low speed modes are not limited to the above description.

Returning to FIG. 2, the description is continued. In S10, specifically, the control section 34 determines the sheet feeding speed of the predetermined high speed mode (any one of A to C) in accordance with the reading resolution specified by the user. Further, in the motor control table 200, the entry corresponding to the determined sheet feeding speed is specified. Then, the process proceeds to step S20.

The control section 34 starts the rotation of the driving motor 44 of the sheet feeding device 40, and accelerates the rotation up to the regular speed (step S20). Specifically, the control section 34 controls the motor in accordance with the number of acceleration steps and the timing information by reading the acceleration control data 220 of the entry of the high speed mode specified in step S10. When the regular speed is reached, the reading of the original document is started by controlling the image sensor 11 (step S30).

In the process of the reading of the original document in the high speed mode, the control section 34 monitors whether or not the data volume of the buffer 32 is more than the predetermined first near-full value (step S40). If the data volume is not more than the first near-full value (step S40: NO), the monitoring is continued. In contrast, if the data volume is more than the first near-full value (step S40: YES), the process proceeds to step S50.

In step S50, the control section 34 starts the deceleration of the rotation of the driving motor 44 of the sheet feeding device 40 and the acceleration of the rotation of the motor 21 of the carriage driving mechanism 20. That is, the reading operation in the deceleration step is started.

Specifically, the control section 34 starts the control of the driving motor 44 in accordance with the number of the deceleration steps and the timing information by reading the deceleration control data 230 of the entry of the high speed mode specified in step S10. Further, the control section 34 starts the control of the motor 21 of the carriage driving mechanism 20 in accordance with the number of acceleration steps and the timing information by reading the carriage control data 240 of the entry of the high speed mode specified in step S10. Then, the process proceeds to step S60.

In the process of the reading of the original document in the deceleration step, the control section 34 monitors whether or not the deceleration step is terminated (step S60). That is, the control section 34 monitors whether or not the deceleration step is terminated by stopping the driving motor 44. If the deceleration step is not terminated (step S60: NO), the monitoring is continued. In contrast, if the deceleration step is terminated (step S60: YES), the process proceeds to step S70.

In step S70, the control section 34 stops the reading operation of the image sensor 11. Further, the control section 34 decelerates and stops the motor 21 of the carriage driving mechanism 20 (step S80). Specifically, the control section 34 controls the motor 21 of the carriage driving mechanism 20 to decelerate and stop by reading the carriage control data 240 of the entry of the high speed mode specified in step S10. Then, the process proceeds to step S90.

In step S90, the control section 34 controls the motor 21 of the carriage driving mechanism 20 to move the carriage 10 in the sub-scanning direction by a distance of the carriage 10 which is moved in the opposite sheet feeding direction by the deceleration in step S80. That is, the carriage 10 returns to the reading position at the time of the restart corresponding to the point B (the restart position of the reading) of FIG. 4.

Furthermore, the moving distance in the sub-scanning direction is determined on the basis of the number of pulses, which are output by the encoder 22, in the deceleration in step S80. It is apparent that the control information may be previously stored in the carriage control data 240 and this information may be used. The moving speed of the carriage 10 may be set as a constant speed at which the acceleration and the deceleration are not required or a speed at which the acceleration and the deceleration are required. In this manner, the control section 34 moves the carriage 10 to the restart position of the reading, and the process proceeds to step S100.

In the process of the stopping of the reading of the original document, the control section 34 monitors whether or not the data volume of the buffer 32 is less than the predetermined near-empty value (step S100). If the data volume is not less than the near-empty value (step S100: NO), the monitoring is continued. In contrast, if the data volume is less than the near-empty value (step S100: YES), the process proceeds to step S110.

In step S110, the control section 34 selects the low speed mode in the sheet feeding speed. Then, the control section 34 controls the driving motor 44 of the sheet feeding device 40 to rotate at the sheet feeding speed, and controls the image sensor 11 to start reading the original document (step S120).

In the process of the reading of the original document in the low speed mode, the control section 34 determines whether or not the reading of an image corresponding to one page is terminated (step S130). If the reading is not terminated (step S130: NO), the process proceeds to step S140. In contrast, if the reading is terminated (step S130: YES), the process proceeds to step S160.

In step S140, the control section 34 monitors whether or not the data volume of the buffer 32 is more than the predetermined second near-full value. If the data volume is not more than the second near-full value (step S140: NO), the process returns to step S130. In contrast, if the data volume is more than the second near-full value (step S140: YES), the process proceeds to step S150.

In step S150, the control section 34 controls the image sensor 11 to stop reading the original document and stop the rotation of the driving motor 44 of the sheet feeding device 40. Then, the process returns to step S100.

In contrast, in step S160, the control section 34 controls the motor 21 of the carriage driving mechanism 20 to move the carriage 10 to the initial reading position. That is, the carriage 10 is moved to the position before the start of the acceleration movement in step S50. Then, the current flow is terminated.

In such a manner, it is possible to perform higher speed image reading without causing distortion in the read image.

Figure 5A:
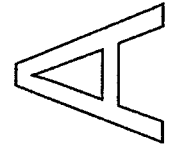
FIGS. 5A, 5B, and 5C are diagrams illustrating an image read from the original image.
Figure 5B:
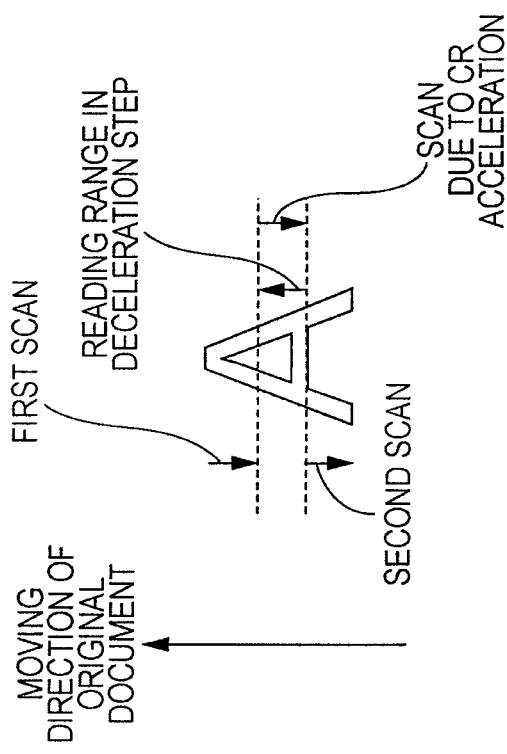
Figure 5C:
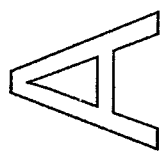

That is, as shown in FIG. 5B, the reading is performed by the acceleration movement of the carriage 10 in the reading range of the original document in the deceleration step. Thereby, the original image in FIG. 5A is read without distortion, thereby generating the output image in FIG. 5C.

Figure 6:
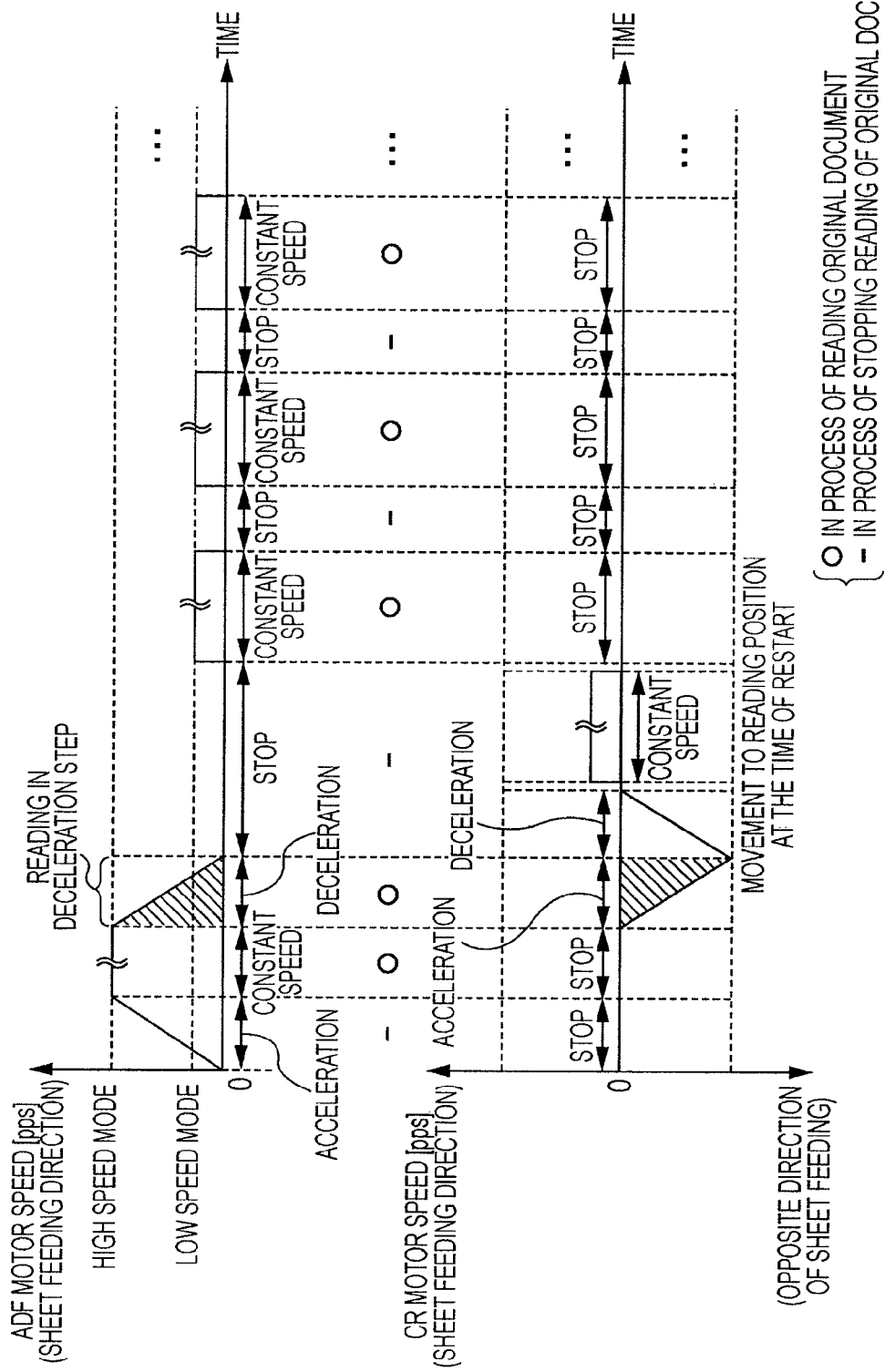
FIG. 6 is a diagram illustrating a relationship between a motor speed of the carriage and a motor speed of the sheet feeding device.

As shown in FIG. 6, until the buffer is full (the first near-full) once, the image reading is performed by the sheet feeding operation of the high speed mode. Then, in the process of the deceleration step of the high speed mode, the carriage 10 is accelerated and moved, and the image reading is continuously performed. When the deceleration step is terminated, the image reading is stopped, and the carriage 10 is decelerated and stopped. Further, the carriage 10 is moved to the reading position at the time of the restart. Then, the second and subsequent image reading operations are performed by the low speed mode. With such a configuration, a speed of the image reading corresponding to one page increases.

As shown in FIG. 6, in the process of the deceleration step, the sum of the inclination of the change in speed of the ADF motor (the driving motor 44) and the inclination of the change in speed of the CR motor (the motor 21) is 0. Further, in the process of the deceleration step, the sum of the absolute values of the ADF motor speed and the CR motor speed at the same time point is equal to the speed of the constant speed step.

To clarify the advantages of the configuration of the image scanner 1 according to the embodiment, the image scanner, of which the carriage 10 is not moved in the process of the deceleration step, is described herein.

Figure 8:
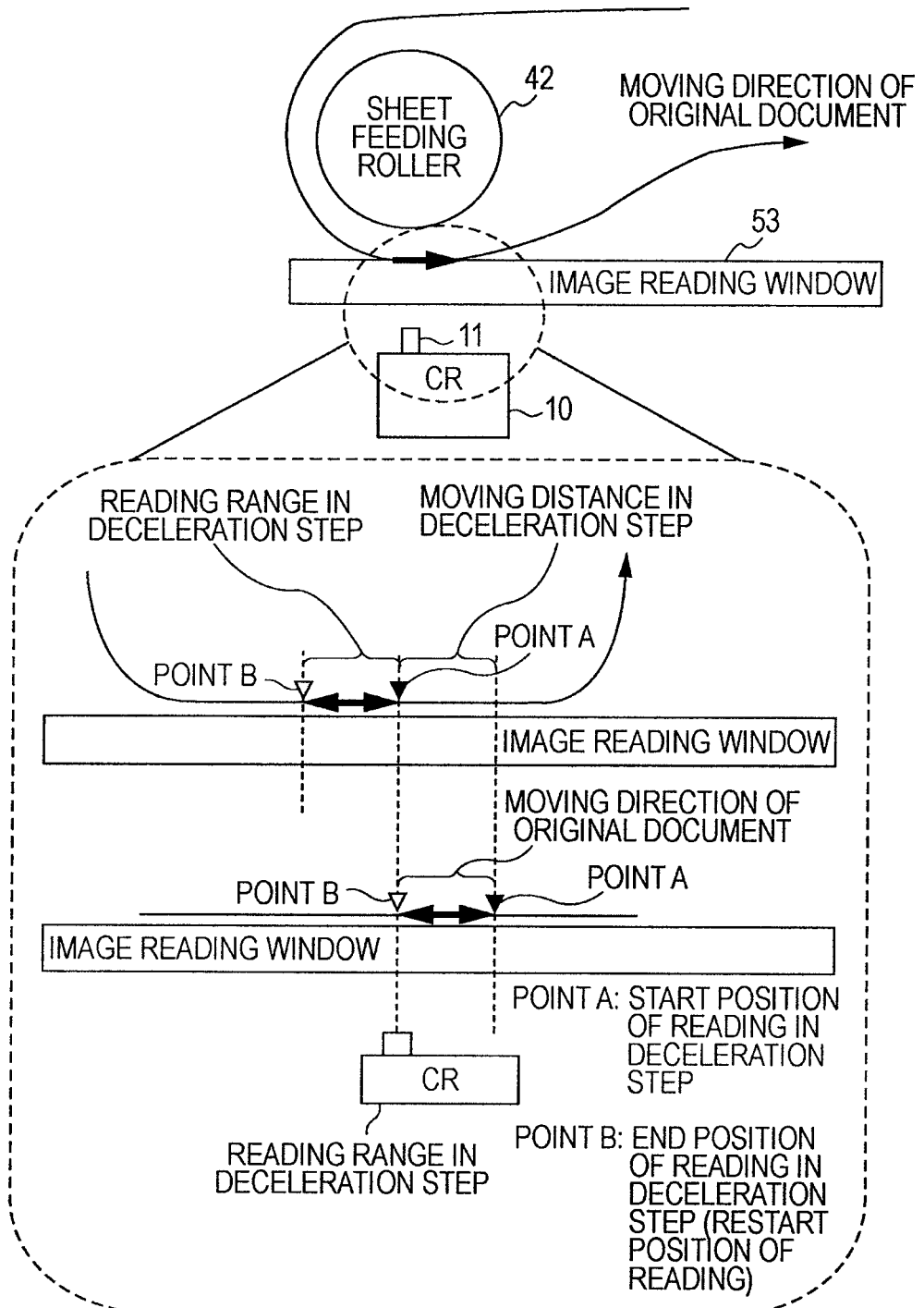
FIG. 8 is a diagram illustrating a relationship between a position of the carriage and a reading range of the original document in the deceleration step when the carriage is not moved.

For example, as shown in FIG. 8, the point A (the reading start position in the deceleration step) of the original document at the time of the end of the constant speed step is gradually decelerated and moved in the sub-scanning direction by the movement of the original document in the process of the deceleration step. Hence, if the reading operation of the image sensor 11 is performed with the position of the carriage 10 fixed in the same manner as that in the constant speed step, the number of reading operations performed on the image increases, and thus distortion occurs in the read image.

Figure 9A:
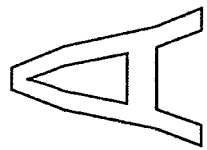
FIGS. 9A, 9B, and 9C are diagrams illustrating an image read from the original image when the carriage is not moved.
Figure 9B:
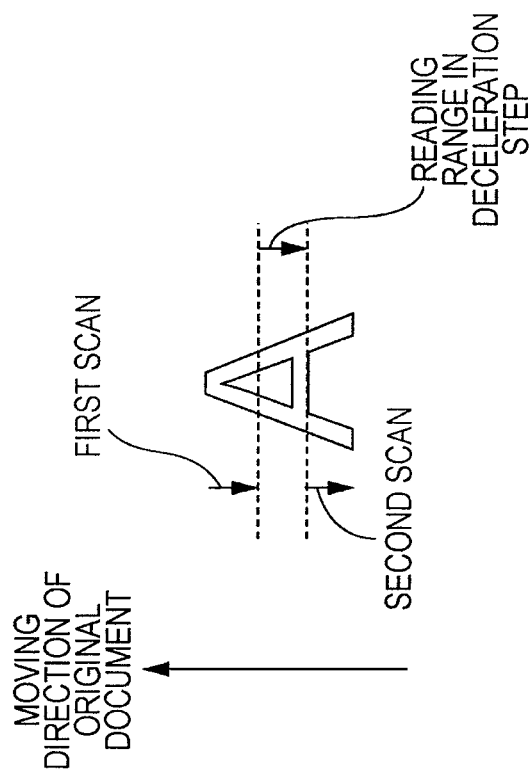
Figure 9C:
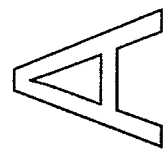

As shown in FIG. 9B, the reading is performed with the carriage 10 fixed in the reading range of the original document in the deceleration step. This causes the distortion at the time of the reading of the original image in FIG. 9A, thereby generating the output image shown in FIG. 9C. Further, to prevent the distortion from occurring, it is required that the low speed mode be used all the time. Thus, it is difficult to increase the reading speed.

The embodiment of the invention has been hitherto described. According to the embodiment, it is possible to perform feasible high speed reading with the simple configuration in the image reading apparatuses including the sheet feeding device.

The above-mentioned embodiment of the invention intends to exemplify the outline and the scope of the invention, and does not limit the invention. It will be readily apparent to those skilled in the art that various modifications, derivations and variations can be made.

MODIFIED EXAMPLE 1

For example, the second and subsequent image reading operations may be performed by the high speed mode, and the image reading may be performed even in the acceleration step of the sheet feeding operation. Specifically, in order to prevent the distortion from occurring in the reading image, the driving motor 44 is accelerated and the motor 21 is decelerated so as to make the sum of the moving speed of the original document and the moving speed of the carriage 10 equal to the predetermined speed of the constant speed step, in the process of the acceleration step of the sheet feeding operation. That is, the control section 34 controls the relative speed of the original document based on the position of the carriage 10 to be constant.

In this case, it is necessary to accelerate the motor 21 up to the predetermined speed in the constant speed step until the acceleration of the driving motor 44 is started in the second and subsequent image reading operations. Further, it is also necessary to control the restart position of the reading to be prevented from being distanced away from the initial reading position in the opposite sheet feeding direction whenever the reading operation is stopped, after the termination of the deceleration step until the start of the acceleration step.

Specifically, after the deceleration and stopping of the motor 21 of the carriage 10, the control section 34 moves the carriage 10 to the predetermined start position of the acceleration farther than the initial reading position in the sub-scanning direction. For example, the start position of the acceleration is a position at which, when the carriage 10 is accelerated and moved in the opposite sheet feeding direction and is decelerated and stopped after the restart of the reading, the stopped position is set as the initial reading position.

Further, after the termination of the deceleration step of the sheet feeding operation, the control section 34 moves the reading end position of the original document to the predetermined restart position of the reading farther than the initial reading position in the sub-scanning direction. For example, the restart position of the reading is a position at which, when the carriage 10 is accelerated and moved away from the start position of the acceleration in the opposite sheet feeding direction, a speed of the carriage 10 reaches the predetermined speed in the constant speed step.

As described above, by correcting the start position of the acceleration of the carriage 10 and the reading end position of the original document, it is possible to prevent the distortion of the image even when the image reading is performed in the process of the acceleration step of the sheet feeding operation. Thereafter, the control section 34 starts the acceleration in the opposite sheet feeding direction of the carriage 10 when the data volume of the buffer 32 is less than the near-empty value.

Then, when the speed of the carriage 10 reaches the predetermined speed in the constant speed step, the control section 34 starts the acceleration of the driving motor 44, the deceleration of the motor 21 of the carriage 10, and the reading operation of the image sensor 11. In the process of the acceleration step of the driving motor 44, the driving motor 44 is accelerated and the motor 21 is decelerated so as to make the sum of the speed of the driving motor 44 and the speed of the motor 21 equal to the predetermined speed in the constant speed step.

In this manner, it is possible to perform the second and subsequent image reading operations in the high speed mode. Furthermore, it is possible to perform higher speed image reading without causing the distortion in the read image even in the acceleration and deceleration steps.

Figure 7:
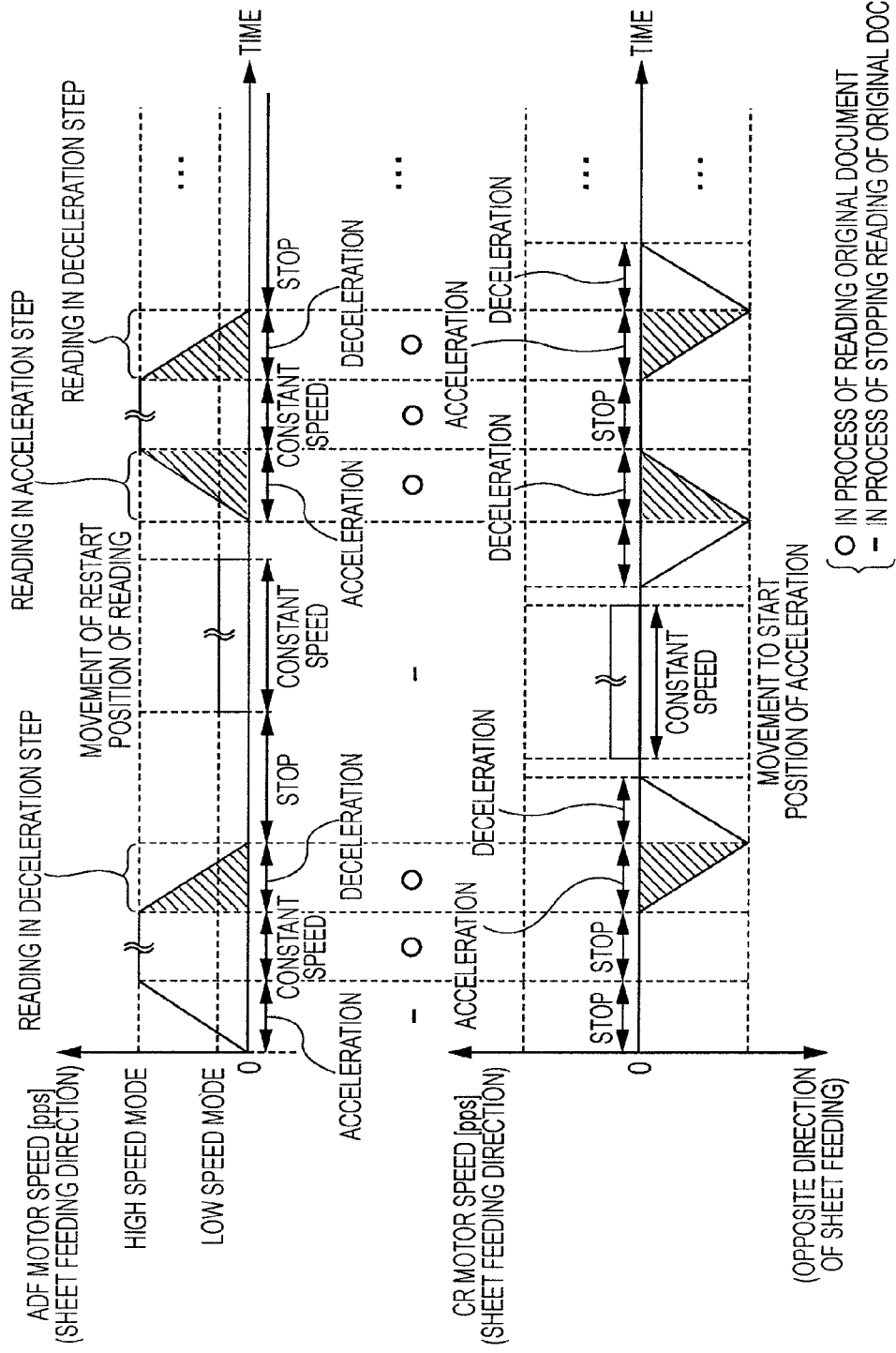
FIG. 7 is a diagram illustrating a relationship between a motor speed of a carriage and a motor speed of a sheet feeding device according to a modified example.

As shown in FIG. 7, after the termination of the first image reading, the restart position of the reading of the original document is moved to the predetermined position for the acceleration step of the second image reading. The carriage 10 is moved to the predetermined start position of the acceleration. Subsequently, the acceleration of the carriage 10 is started. Then, in the process of the acceleration step of the high speed mode, the carriage 10 is decelerated and moved, thereby performing the image reading. When the acceleration step is terminated, the carriage 10 is stopped, and subsequently the image reading in the constant speed step is performed. Subsequently, the image reading operations of the deceleration step and the acceleration step are repeated in the same manner.

As shown in FIG. 7, in the process of the acceleration step the sum of the inclination of the change in speed of the ADF motor (the driving motor 44) and the inclination of the change in speed of the CR motor (the motor 21) is 0. Further, in the process of the acceleration step, the sum of the absolute values of the ADF motor speed and the CR motor speed at the same time point is equal to the speed of the constant speed step.

OTHER MODIFIED EXAMPLES

For example, the movement of the carriage 10 toward the restart position of the reading (FIG. 2: step S90) may not be started right after the deceleration and stop of the carriage 10 (step S80). The movement may be completed until the start of the reading operation of the image sensor 11 (step S120).

When the reading is performed on a plurality of pages, the process of the flow of FIG. 2 may be repeated for each page. Further, when the reading is successively performed on the plurality of pages, the process of the flow of FIG. 2 may be repeated until the reading of the previous page is terminated by determining whether or not the reading of the previous page is terminated in step S130 of FIG. 2.

The driving motor 44 of the sheet feeding device 40 is not limited to the stepping motor, and may be, for example, a DC motor or the like.

The invention may be applicable to copiers, multi-functional printers, and the like each having an image scanner.

What is claimed is:

1. An image reading apparatus comprising:
a sheet feeding device;
a sheet feeding section that controls transport of an original document performed by the sheet feeding device;
a reading section that outputs image data by reading the original document;
a carriage that is equipped with the reading section;
a carriage control section that controls movement of the carriage;
a buffer that temporarily stores the image data; and
a monitoring section that monitors a volume of the image data stored in the buffer,
wherein when the monitoring section determines that the volume of the image data is more than a predetermined first threshold value,
the sheet feeding section decelerates and stops the transport of the original document,
the carriage control section accelerates the carriage in a direction opposite to the transport of the original document during a deceleration period of the transport of the original document, and
the reading section successively reads the original document before start of the deceleration period of the transport of the original document and during the deceleration period.

2. The image reading apparatus according to claim 1, wherein a relative speed of the original document based on a position of the carriage is constant during the deceleration period of the transport of the original document.

3. The image reading apparatus according to claim 1, wherein when the monitoring section determines that the volume of the image data is less than a predetermined second threshold value,
the sheet feeding section starts acceleration of the transport of the original document,
the carriage control section accelerates the carriage in a direction opposite to the transport of the original document before start of an acceleration period of the transport of the original document, and decelerates the carriage in a direction opposite to the transport of the original document during the acceleration period of the transport of the original document, and
the reading section restarts reading of the original document at the time of the start of the acceleration of the transport of the original document.

4. The image reading apparatus according to claim 1, wherein the first threshold value is changeable in accordance with a length of the deceleration period.

5. An image reading method for an image reading apparatus which has a sheet feeding device for transporting an original document, a carriage, and a buffer for temporarily storing image data of the read original document, the image reading method comprising:
determining whether or not a volume of the image data stored in the buffer is more than a predetermined first threshold value; and
reading the original document successively before start of a deceleration period of the transport of the original document and during the deceleration period by decelerating and stopping the transport of the original document and accelerating the carriage in a direction opposite to the transport of the original document during the deceleration period of the transport of the original document when the volume of the image data is more than the first threshold value.

6. A computer-readable storage medium having a program recorded thereon for causing an image reading apparatus, which has a sheet feeding device for transporting an original document, a carriage, and a buffer for temporarily storing image data of the read original document, to perform an image reading process, the program causing the image reading apparatus to execute:
determining whether or not a volume of the image data stored in the buffer is more than a predetermined first threshold value; and
reading the original document successively before start of a deceleration period of the transport of the original document and during the deceleration period by decelerating and stopping the transport of the original document and accelerating the carriage in a direction opposite to the transport of the original document during the deceleration period of the transport of the original document when the volume of the image data is more than the first threshold value.

* * * * *